Oct. 3, 1961

L. C. RABBITTS 3,002,523

CONTINUOUS VACUUM FILTRATION SYSTEM WITH
FILTRATE INTERCEPTING APPARATUS

Filed July 10, 1957

INVENTOR
Leonard C. Rabbitts
BY Theodore M. Jablon
ATTORNEY

INVENTOR
Leonard C. Rabbitts
BY Theodore M. Jablon
ATTORNEY

INVENTOR
Leonard C. Rabbitts
BY Theodore M. Jablon
ATTORNEY

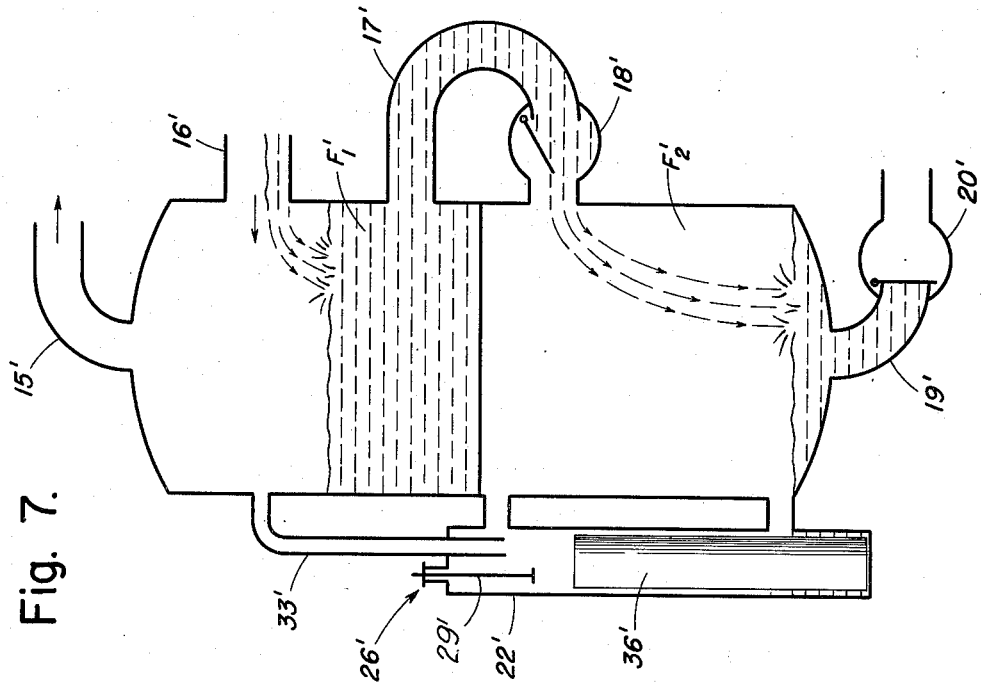
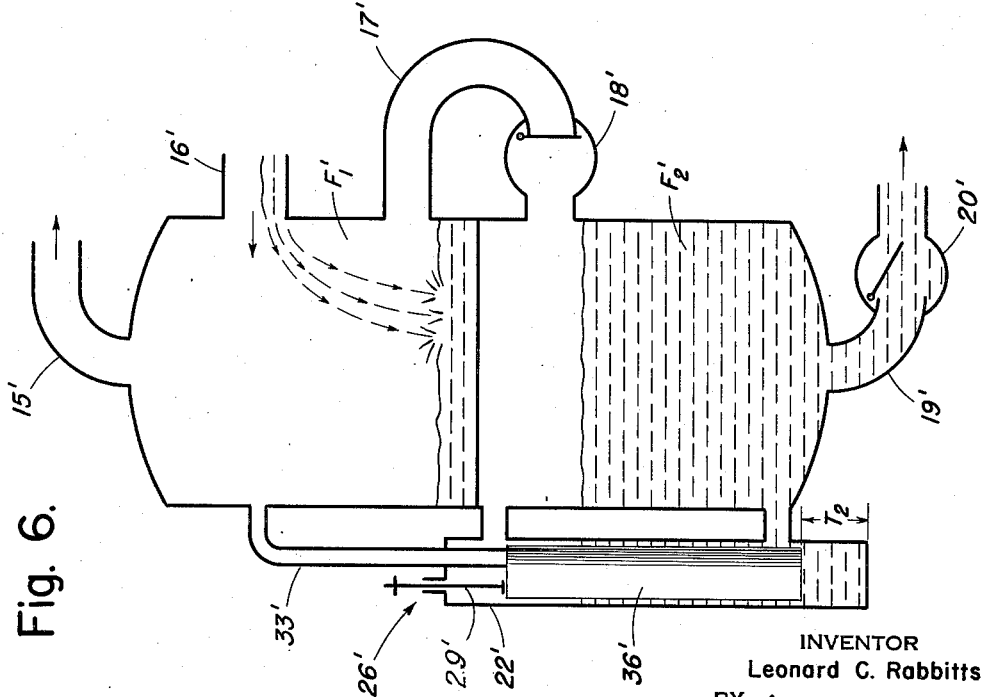

United States Patent Office 3,002,523
Patented Oct. 3, 1961

3,002,523
CONTINUOUS VACUUM FILTRATION SYSTEM
WITH FILTRATE INTERCEPTING APPARATUS
Leonard C. Rabbitts, Orillia, Ontario, Canada, assignor to
Dorr-Oliver Incorporated, Stamford, Conn., a corporation of Delaware
Filed July 10, 1957, Ser. No. 671,034
6 Claims. (Cl. 137—205)

This invention relates to continuous vacuum filtration systems employing a continuous rotary drum type filter unit to which suction is continuously applied for drawing liquid or filtrate from the interior of the filter drum while the drum rotates with its lower peripheral portion continuously immersed in a tank to which pulp is supplied continuously for filtration, while filter cake is continuously removed at a point of the emerged peripheral portion of the drum.

More particularly, this invention relates to the filtrate receiving apparatus that is interposed between the suction means or air suction pump and the filter unit for the purpose of intercepting or trapping and discharging the filtrate liquid from the vacuum system.

It is an object of this invention to provide filtrate receiving apparatus that is simple, practical, and foolproof, for automatically discharging the filtrate liquid from the vacuum system while avoiding the use of the well-known height-consuming barometric leg. More compactly, this invention aims to provide a filtrate receiver tank with automatic control means that are simple and foolproof as well as non-electrical in operation, for periodically discharging an accumulation of the filtrate liquid from this vacuum system without breaking the vacuum itself, and which is independent of such structural heights as are required by the barometric leg type of filtrate discharge.

Hence, this invention aims to provide such filtrate receiving apparatus in which the periodic discharge of the filtrate liquid is automatically float-controlled.

This object is obtained by providing tank structure which comprises an upper filtrate storage chamber and a lower filtrate storage chamber communicating with each other in such a manner that an accumulation of filtrate in the upper chamber may through a check valve gravitate and drain into the lower chamber from which in turn it may discharge through a discharge check valve directly into the atmosphere for disposal or to waste.

With the filtrate liquid being supplied continuously from the filter unit to the receiver tank structure, the two receiver chambers are filled and emptied in alternation, with the upper chamber kept under filter vacuum at all times and the lower chamber vented periodically to the atmosphere. In this way, the upper chamber being under vacuum at all times serves as a holdover chamber for accumulating continued filtrate flow during the period that the lower chamber is draining its accumulation into the atmosphere. In this receiver operating cycle, after the lower chamber has been emptied and with the upper chamber part-filled, common vacuum is restored to both chambers, so the accumulation from the upper chamber can transfer to the lower chamber by gravitation even as the filtrate liquid supply from the filter unit continues. Thus again the lower chamber fills up while the upper chamber continues under vacuum. With the lower chamber again full, the operating cycle will repeat itself.

The receiver operating cycle just outlined is more fully defined as follows:

Both receiver storage chambers are kept under filter vacuum for a length of time during which the discharge check valve of the lower chamber is kept closed by the outer atmospheric pressure, while filtrate liquid from the filter unit is free to gravitate through the intermediate check valve between the chambers to accumulate in the lower chamber. When the lower chamber is thus filled to a pre-determined maximum liquid level with a freeboard space above, the lower chamber is vented to the atmosphere, while the upper chamber is continued under vacuum. Thus the atmospheric pressure in the lower chamber keeps the intermediate check valve between the chambers closed while allowing the continued flow of filtrate from the filter unit to accumulate and be held over in the upper chamber even as the lower chamber drains its previously accumulated contents into the atmosphere via the discharge check valve. When the lower chamber has thus drained and the upper chamber part-filled, common vacuum is again restored to both chambers so that the accumulation of the upper chamber through the intermediate check valve will again gravitate into the lower chamber, even as the filtrate supply continues flowing into the receiver, thus again filling the lower chamber and initiating a new receiver operating cycle.

Automatic control of this filtrate receiver operating cycle is effected by providing the lower chamber with a controllable vent connection to the atmosphere, and also providing a controllable pressure equalizing connection between the two chambers to interconnect the respective freeboard spaces of the chambers. Automatic control of the fill and discharge receiver operating cycle is effectuated by way of float means actuated by the rising liquid level in the lower chamber. As the filtrate accumulation in the lower chamber reaches its maximum level, the float means carried upward by the liquid become effective to actuate the vent connection so as to open the lower chamber to the atmosphere, while substantially concurrently closing the pressure equalizing inter-connection between the chambers thereby confining the vacuum to the upper chamber. In fact, to operate precisely, the timing of these two control functions is such that the equalizing inter-connection between the chambers will close just slightly before the atmospheric vent connection opens. With that, the communicating check valve between the chambers closes due to the atmospheric pressure entering the lower chamber, whereas by the same token the discharge check valve from the lower chamber opens into the atmosphere. Hence, filtrate accumulation in the lower chamber drains out, even as the upper chamber again fills part-way up before initiating a new receiver operating cycle.

Features of this invention lie in the manner in which all the control means as well as the interconnections or conduits effective between the two receiver chambers are accessibly disposed outside the receiver tank structure proper.

Other features lie in the float actuated control devices, and more specifically in the fact that both, the vent connection and the pressure equalizing connection, are closed or opened respectively by a single float body carried by the liquid accumulation in the lower chamber.

In a preferred embodiment, a receiver tank is horizontally divided into an upper and a lower receiver chamber. A float chamber is disposed outside of and fixedly with respect to the lower chamber, to have a lower communicating connection with the liquid filled lower portion of that chamber, and an upper communicating connection with the freeboard space of that chamber. The pressure equalizing connection or pipe extends from the freeboard space of the upper receiver chamber into the float chamber, the downward open end of that pipe terminating in the corresponding freeboard space of the float chamber. In this way, the upper receiving chamber has pressure equalizing connection with the lower chamber via the freeboard space in the float chamber, with the open end of the interconnecting pipe being closable by the single float body itself when the same rises in the float chamber due to the filling of the lower chamber. Also provided in the top of the float chamber is a controllable vent connection or vacuum breaking device resembling a poppet valve disc closing down upon the vent opening and having an actuating stem depending into the float chamber and thus engageable by the float body so that the vent will be opened to break the vacuum in the lower chamber just a trifle before the float body closes the pressure equalizing connection. In this way, the single float body will lift the vent closing valve disc against the atmospheric load bearing down thereon, and in so doing will engage and close the downward facing open end of the pressure equalizing pipe whereupon the float will be bodily held to that opening by the suction vacuum effective in the upper chamber.

Consequently, with atmospheric pressure thus established in the lower chamber and vacuum continuing in the upper chamber, the intermediate check valve will close allowing the continuing filtrate supply to accumulate in the upper chamber, while preceding accumulation in the lower chamber will drain to waste or disposal through the discharge check valve into the atmosphere.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

FIGURES 4, 5, 6, and 7, are diagrammatic views of the receiver apparatus, showing the sequential phases of the receiver operating cycle.

Figure 1:
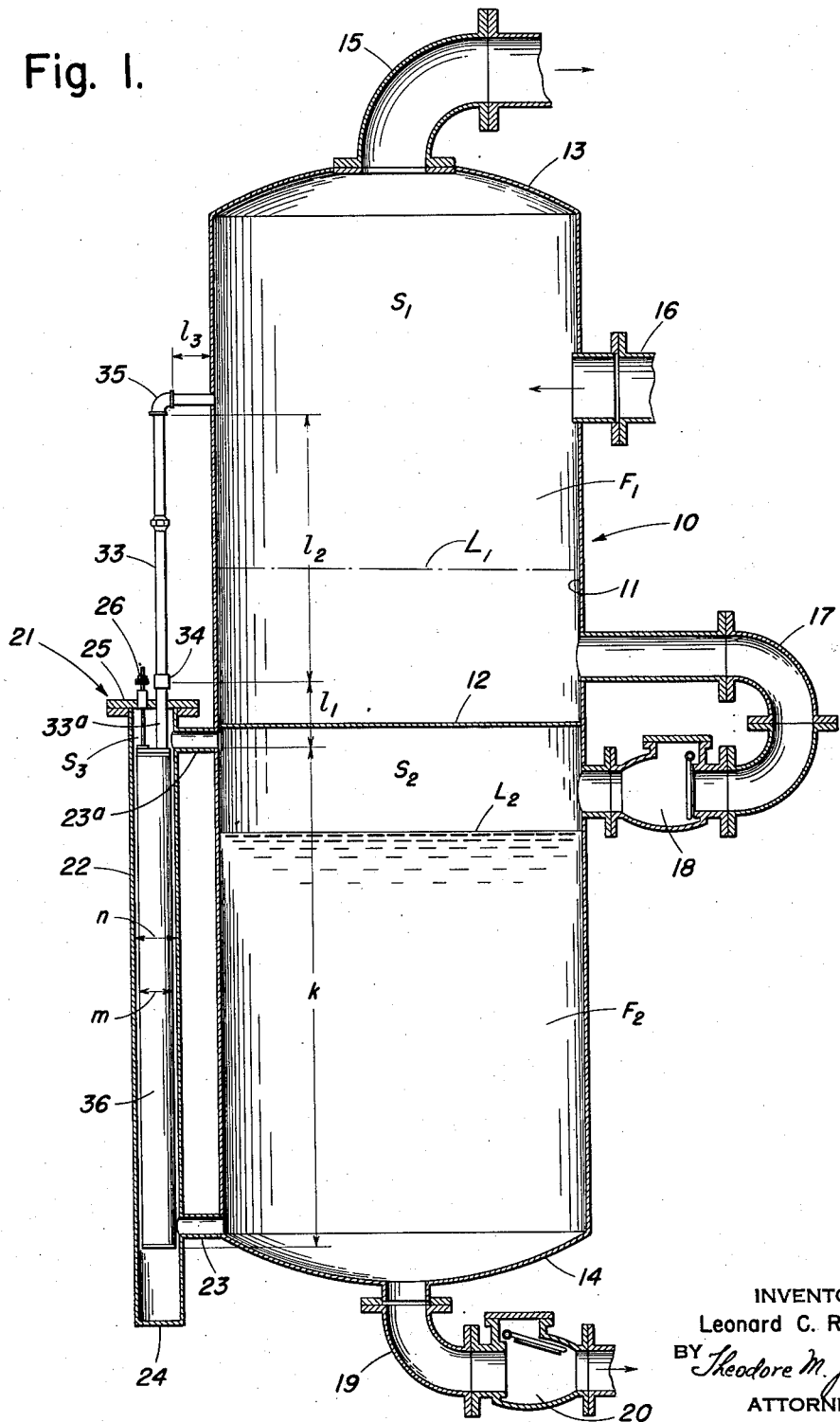
FIGURE 1 is a vertical sectional view of the filtrate receiver apparatus provided with float-controlled devices for ensuring automatic repetitive performance of the receiver operating cycle.

The filtrate receiver apparatus, herein also briefly termed the filtrate receiver, is shown in FIGURE 1 to comprise a vertical two-compartment closed tank 10 consisting of a cylindrical wall 11, a horizontal partition wall 12, a top 13, and a bottom 14. In this way, the vertical tank 10 is horizontally subdivided to form upper and lower filtrate storage chambers $F_1$ and $F_2$ respectively. The upper chamber $F_1$ has at the top a vacuum suction connection 15, and laterally it is provided with an inlet connection 16 for the filtrate liquid.

Each of these chambers $F_1$ and $F_2$ periodically accumulates a charge of filtrate liquid up to a predetermined maximum level potentially indicated at $L_1$ and $L_2$ respectively, which levels define respective free boardspaces $S_1$ and $S_2$ in the respective storage chambers $F_1$ and $F_2$ of the receiver tank.

A one-way U-shaped filtrate transfer conduit 17 interconnects the lower portion of the upper chamber $F_1$ with the freeboard space of the lower chamber $F_2$, comprising a transfer check valve unit 18 of the flap valve type. The lower chamber $F_2$ is provided at its bottom with a discharge connection 19 including a discharge check valve 20 of the flap type similar to the transfer check valve 18.

The control devices for ensuring the automatic periodical repetition of the receiver operating cycle comprises a float controlled device or float chamber unit 21 structurally associated with the lower storage chamber $F_2$ by way of communicating connections with the upper and lower portions of that chamber. This float chamber unit comprises a tubular chamber 22 vertically co-extensive with the chamber $F_2$ and communicating therewith through a lower communicating connection 23 at the bottom, and an upper communicating connection 23a leading to the freeboard space $S_2$ of chamber $F_2$. The float chamber 22 has a flat bottom 24 and a flange-connected removable top cover plate 25, and it has a potential free boardspace $S_3$ defined by the liquid level $L_2$ in the associated chamber $F_2$, as well as a bottom end portion constituting a pocket extending downwardly below the bottom of the lower chamber $F_2$.

Figure 2:
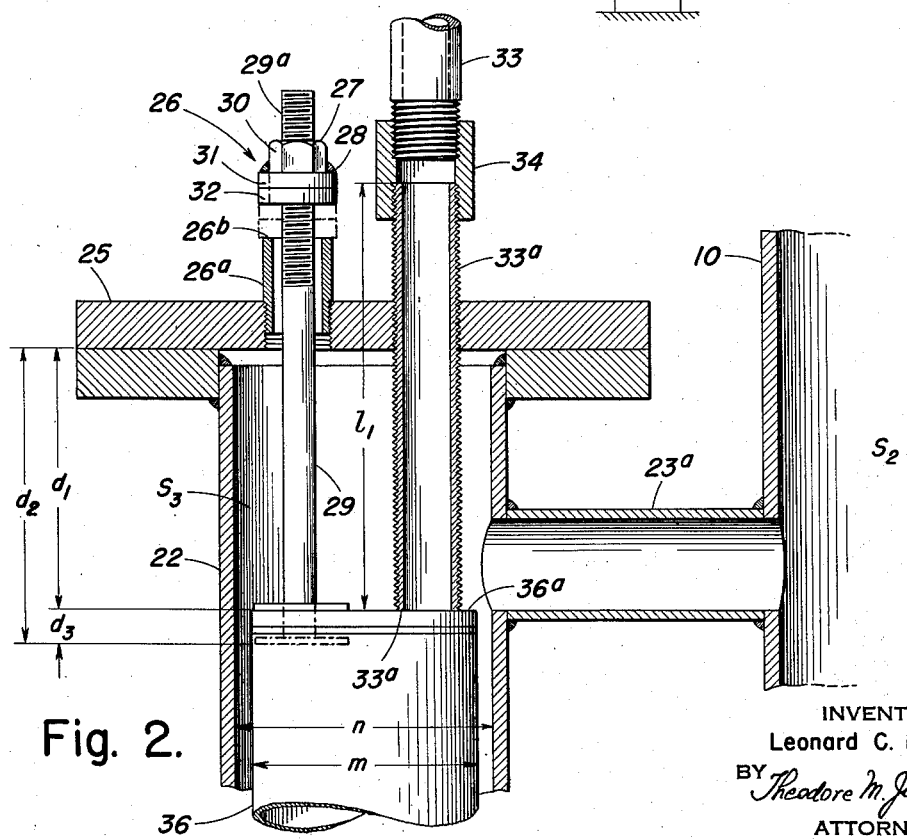
FIGURE 2 is a greatly enlarged detail view of a characteristic portion of the control devices.

Referring more especially to FIGURE 2, the top cover plate 25 has a controllable atmospheric vent opening or vent connection 26 here indicated by a short length of pipe 26a having a top edge 26b, screwed into the top plate 25. Associated with this vent connection is a vent closure member 27 consisting of a closure head 28 mounted upon the top end portion of a vertical rod or stem 29 depending into the freeboard space $S_3$ within the float chamber 22. That is to say, the rod 29 has an upper threaded portion 29a onto which is screwed a nut 30 unitary with a collar 31 constituting the vent closure head 28. The collar 31 in turn is unitary with an annular pad 32 consisting of a semi-solid substantially resilient material in the order of a suitable grade of rubber for sealingly engaging or seating upon the top edge 26b of short pipe 26a to close the vent.

A pressure equalizing pipe 33 connects the freeboard space $S_1$ of the upper storage chamber $F_1$ with the freeboard space $S_3$ of the float chamber and thereby with the freeboard space $S_2$ of the lower storage chamber $F_2$. The equalizing pipe 33 leads from the upper chamber down through the cover plate 25 of the float chamber 22 and has a downwardly open terminal portion 33a extending a distance $d_1$ down into the freeboard space $S_3$ of that chamber.

From FIGURES 1 and 2 it can be seen that the equalizing pipe 33 comprises a lower terminal portion of a length "$l_1$" of threaded vertical pipe screwed into the cover plate of the float chamber, an intermediate vertical length of pipe $l_2$ connected as by a nipple 34 to the threaded length $l_2$, and an upper horizontal terminal length of pipe $l_3$ connected with the intermediate length $l_2$ through an elbow fitting 35.

The tubular float chamber contains a hollow cylindrical float body 36 of the length "$k$" and the diameter "$m$" having sufficient loose play as well as guidance within the somewhat larger diameter "$n$" of the surrounding float chamber 22. The top of the float body 36 has provided thereon and unitary therewith a horizontal pad 36a of semi-solid somewhat resilient material such as a suitable grade of rubber, adapted when the float body is rising to seat against and sealingly close the downward open end of pressure equalizing pipe 33.

With the float body in a lower or non-engaged position, the vent opening is closed with the actuating stem 29 depending a distance $d_2$ into the float chamber and terminating downwardly a distance $d_3$ beyond the comparable length $d_1$ of the equalizing pipe 33 within the float chamber. Thus when the float body is rising it will act sequentially to first engage the actuating stem 29 to open the vent to admit the atmosphere, and then sealingly engage and close the lower open end of equalizing pipe 33.

The relative timing between these two functions as determined by the differential distance $d_3$ is adjustable by way of lengthening or shortening the effective length of the vent-actuating stem 29, namely by way of screwing the head or nut 28 up or down the upper threaded portion 29a of the stem.

Figure 3:
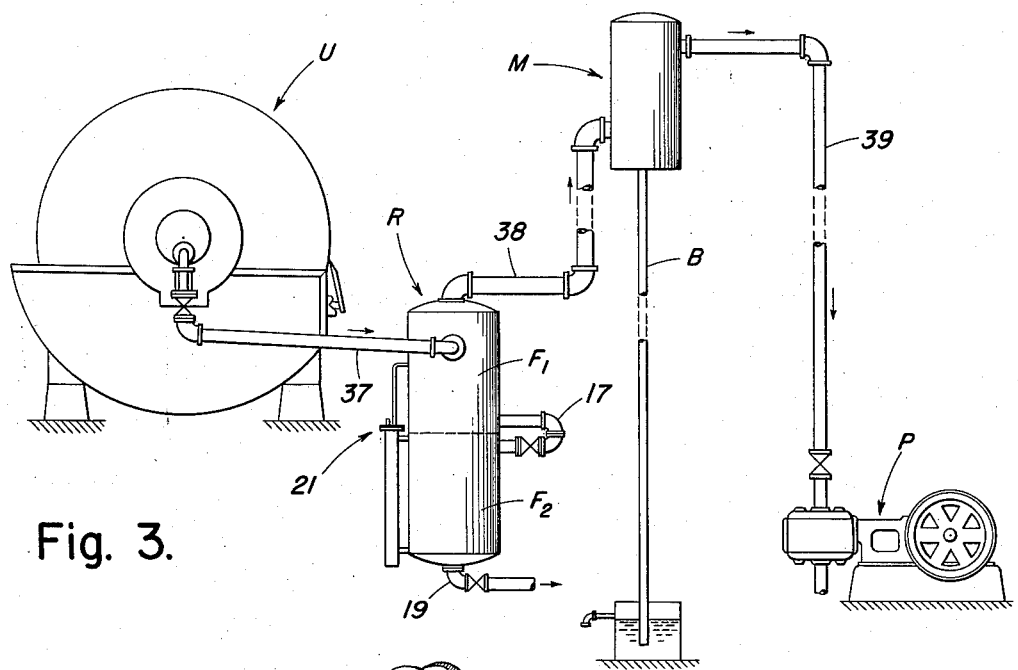
FIGURE 3 is a diagrammatic side view of a vacuum filtration system including the filtrate receiver apparatus.

FIGURE 3 is a schematic showing of a complete vacuum filtration system comprising a conventional rotary drum type vacuum filter unit U for continuous filter operation, the filtrate receiver apparatus or unit previously described in detail in connection with FIGURES 1 and 2 and here designated by the collective letter R, a moisture collecting chamber or trap M provided with conventional barometric leg type liquid discharge B, and a rotary motor-driven vacuum suction pump unit P. A suction line 37 (corresponding to the connection 16 in FIGURE 1) leads from the vacuum filter unit U to carry a mixture of filtrate liquid and air to the side of freeboard space $S_1$ of the upper receiver chamber $F_1$ of the receiver unit R. Suction pipe 38 connects the top of the upper chamber $F_1$ with the moisture trap M. A pipe 39 carries de-moisturized air from the trap M to the vacuum suction pump of suction unit P.

By reference to the diagrammatic FIGURES 4, 5, 6, and 7, there will now be described the automatically repetitive operating cycle whereby the receiver tank intermittently discharges a predetermined volume of filtrate liquid even though the supply of filtrate from the filter to the receiver continue uninterruptedly. The filtrate receiver unit shown in these diagrammatic figures is in essence the same as that described above in connection with FIGURES 1 and 2. Therefore, parts of that unit, FIGURES 4, 5, 6, and 7, are here designated by the same numerals as the corresponding parts in FIGURES 1 and 2, even though differentiated by the application of the prime sign to these numerals.

Figure 4:
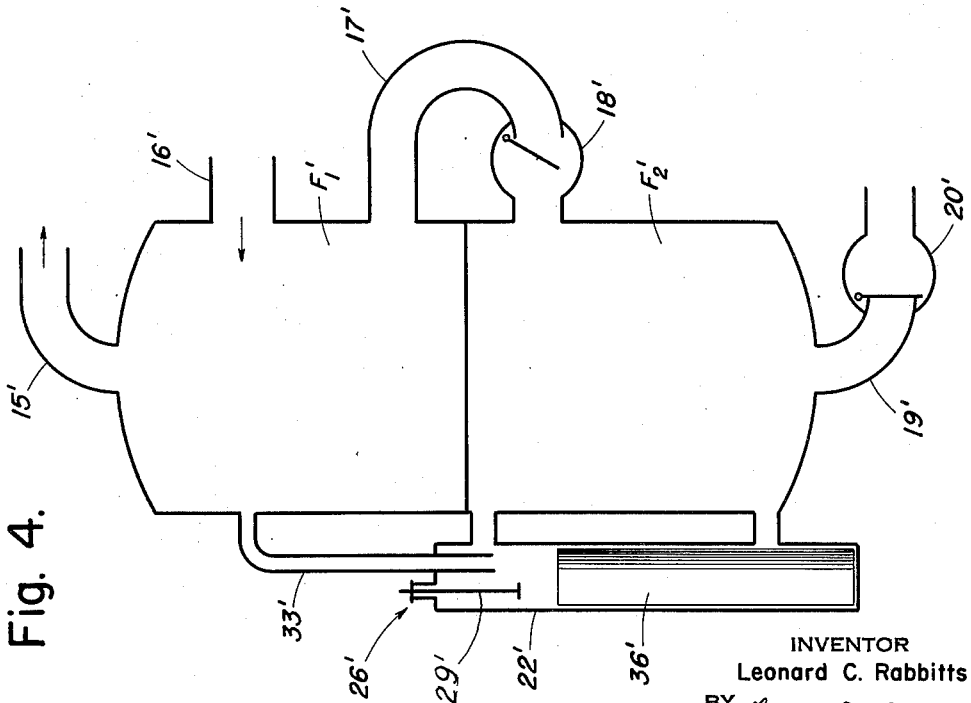

The starting phase of the operating cycle as represented in FIGURE 4 assumes both receiver chambers $F_1'$ and $F_2'$ to be empty, with the float body 36' resting at the bottom of the float chamber 22', the controllable vent connection 26' being closed against the atmosphere, and the pressure equalizing connection or pipe 33' open between the potential freeboard spaces in the storage chambers $F_1'$ and $F_2'$. As filter operating suction is applied to the receiver unit through connection 15', filter vacuum is established in both chambers $F_1'$ and $F_2'$ effective to maintain the discharge check valve 20' closed, but the intermediate liquid transfer check valve 18' free to open with a subatmospheric pressure on both sides of valve 18' being equal at this time.

Figure 5:
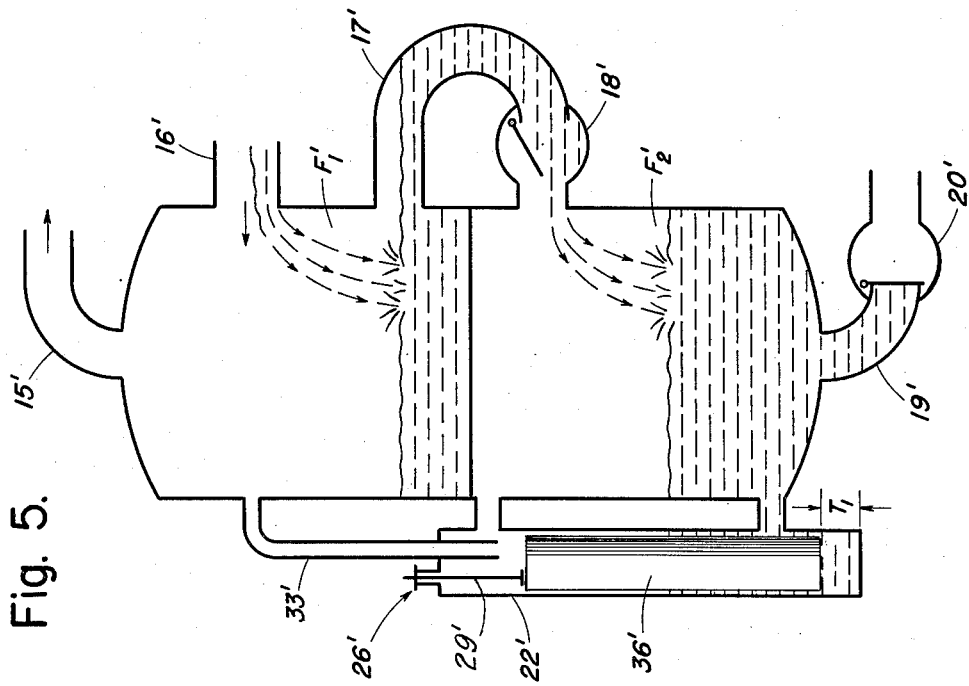

With suction being maintained (see FIG. 5), an air liquid mixture enters the upper chamber $F_1'$ where moisture laden air separates from the filtrate liquid allowing the liquid to gravitate through transfer connection 17' via transfer check valve 18' down into the lower chamber $F_2'$. The operational phase represented in FIGURE 5 shows the lower chamber $F_2'$ now partially filled, with the float body 36' thus lifted a distance $T_1$ off the bottom of the float chamber 22' and the still prevailing subatmospheric pressure in both chambers $F_1'$ and $F_2'$ still effective to keep the discharge check valve 20' closed against the atmosphere. With the filling of the lower chamber $F_2'$ the float body 36' rises from the bottom of the float chamber until having risen a distance $T_1$ it engages the vent actuating rod 29' as is indicated in FIGURE 5.

As the supply of filtrate liquid continues into the receiver unit, the liquid accumulating in the lower chamber $F_2'$ now reaches a predetermined maximum level at which the buoyancy of the float body 36' will suffice (see FIG. 6) to exert enough upward thrust against the actuating stem 29' to open the vent against the pressure of the atmosphere even while sealingly engaging upon and closing the open end of equalizing pipe 33'. With that condition established as in FIGURE 6, the vacuum suctions now confined to the upper chamber $F_1'$ will hold the float member 36' engaged upon the equalizing pipe 33'. But with the atmospheric vent now open, the liquid accumulation in the lower chamber $F_2'$ is now free to drain through the discharge check valve 20' to atmosphere for further disposal. Meanwhile, the continuing flow of filtrate liquid into the receiver unit accumulates and is stored and held over in the upper chamber $F_1'$ until the lower chamber $F_2'$ has drained sufficiently and the filtrate accumulation in the upper chamber has reached its level $L_1$ at which time common vacuum is again to be restored in both chambers $F_1'$ and $F_2'$.

Referring now to the final FIGURE 7, common vacuum in both chambers is restored when the accumulation in the lower chamber of FIGURE 6 will have drained to a low enough level, so that the float body 36' will drop out of closing engagement with the equalizing pipe 33' and will disengage itself from the vent actuating stem 29', thus to allow the atmospheric vent connection to close while restoring pressure equalization and common vacuum between the upper and the lower chamber of the receiver unit. With the float body 36' thus again resting upon the bottom of the float chamber 22' (see FIG. 1) the lower chamber $F_2'$ may fill anew while receiving the accumulation of filtrate from the upper chamber $F_1'$.

In this way, the receiver unit will adjust itself to demand. That is to say, the frequency of the operating cycle just described will automatically adjust itself to the rate at which filtrate liquid is supplied from the filter to the receiver unit.

In a practical instance of vacuum filtration the length of time required for filling the lower chamber $F_2'$ and the length of time required for discharging it from that chamber is about as three to one. In other words, if under such conditions it takes 45 seconds to fill the lower chamber, then the bottom discharge valve of the lower chamber must be capable of discharging the required volume of liquid in about 15 seconds or less. This can be effected by providing that both the air vent opening at 26 and the bottom valve large enough to fulfill that ratio. Under such conditions, since the upper chamber accumulates liquid only during this discharge period, it is normally never more than about one third filled and even less. By thus proportioning the receiver adequate volume of space is provided for enabling the air and the filtrate to separate.

The float 36 is weighted to such an extent that after the liquid in the lower compartment has drained to a low enough level, the weight of the float will break the suction lift on pipe $33^a$ positively in such a manner as to effect a pop action or quick closing of the air valve 26. A similar quick action effect applies when the float is rising and must overcome the atmospheric pressure acting on vent closure valve 26, to effect a snappy closing of the pressure equalizing pipe 33.

Whereas the invention is herein illustrated as in connection with continuous vacuum filter operation, it should be understood that it is by no means to be so limited. Hence, the invention more broadly applies to a receiver for trapping and automatically removing liquid from a continuous vacuum system. For example, it is applicable to a moisture trap scrubber, or to the operation of a condenser, or with any apparatus arrangement otherwise requiring the provision of a barometric leg for the removal of liquid accumulation from a vacuum system.

I claim:

1. In a receiver apparatus operating in repetitive automatic fill and discharge cycles for discharging liquid from a vacuum system wherein liquid supplied under vacuum to an upper storage chamber gravitates through a transfer check valve into a lower storage chamber having pressure equalizing connection with the upper chamber so that the liquid will accumulate in the lower chamber to a point where float control means associated with the lower chamber become effective to interrupt the pressure equalizing connection while breaking the vacuum in the lower chamber thus causing said transfer check valve to close and allowing continued supply of liquid to accumulate in the upper chamber under the vacuum while the first mentioned accumulated liquid drains through a discharge check valve from the lower chamber into the atmosphere until the float control means restore the vacuum to both chambers whereby accumulation of liquid in the lower chamber repeats itself; improved float control means which comprise a float chamber arranged laterally of said lower chamber and communicating with the liquid as well as with the freeboard space in the lower chamber; atmospheric relief valve means mounted in the top end of the float chamber comprising a relief valve member having a valve head and a stem depending therefrom and associated with a downwardly open end portion of said pressure equalizing connection extending through and mounted in said top end of the float chamber adjacent to said relief valve member and terminating in the freeboard space defined by the liquid level in the lower chamber; and a float body loosely guided vertically by said float chamber when rising and falling with the liquid in the lower chamber, and having a top end providing an upward closure face for sealingly engaging the mouth of said downwardly open end portion of the equalizing connection to close the same when the float body rises with said liquid, said top end of the float body also effective to actuate said relief valve member to break the vacuum in said lower chamber in timed relationship to the closing of said mouth, said float chamber having a removable top end plate end constituting with said relief valve member and with said downwardly open end portion of said pressure equalizing connection a removable sub-assembly unit, and wherein adjustment means are provided for varying the differential of length between said valve member and the associated end portion of the equalizing connection for varying said timed relation between the breaking of the vacuum and the closing of the mouth.

2. In a receiver apparatus operating in repetitive automatic fill and discharge cycles for discharging liquid from a vacuum system wherein liquid supplied under vacuum to an upper storage chamber gravitates through a transfer check valve into a lower storage chamber having pressure equalizing connection with the upper chamber so that the liquid will accumulate in the lower chamber to a point where float control means associated with the lower chamber become effective to interrupt the pressure equalizing connection while breaking the vacuum in the lower chamber thus causing said transfer check valve to close and allowing continued supply of liquid to accumulate in the upper chamber under the vacuum while the first mentioned accumulated liquid drains through a discharge check valve from the lower chamber into the atmosphere until the float control means restore the vacuum to both chambers whereby accumulation of liquid in the lower chamber repeats itself; improved float control means which comprise a float chamber arranged laterally of said lower chamber and communicating with the liquid as well as with the freeboard space in the lower chamber; atmospheric relief valve means mounted in the top end of the float chamber comprising a relief valve member having a valve head and a stem depending therefrom and associated with a downwardly open end portion of said pressure equalizing connection extending through and mounted in said top end of the float chamber adjacent to said relief valve member and terminating in the freeboard space defined by the liquid level in the lower chamber; and a float body loosely guided vertically by said float chamber when rising and falling with the liquid in the lower chamber, and having a top end providing an upward closure face for sealingly engaging the mouth of said downwardly open end portion of the equalizing connection to close the same when the float body rises with said liquid, said top end of the float body also effective to actuate said relief valve member to break the vacuum in said lower chamber in timed relationship to the closing of said mouth, said float chamber having a removable top end plate constituting with said relief valve member and with said downwardly open end portion of said pressure equalizing connection a removable sub-assembly unit, and wherein said end portion of the equalizing connection comprises a length of pipe having external thread screwed into said top plate, the length of said thread being such as to allow for axial adjustment of said end portion relative to said plate for varying the length differential between said valve member and the associated end portion of the equalizing pipe for thereby varying said timed relation between the breaking of the vacuum and the closing of the mouth.

3. In a receiver apparatus operating in repetitive automatic fill and discharge cycles for discharging liquid from a vacuum system wherein liquid supplied under vacuum to an upper storage chamber gravitates through a transfer check valve into a lower storage chamber having pressure equalizing connection with the upper chamber so that the liquid will accumulate in the lower chamber to a point where float control means associated with the lower chamber become effective to interrupt the pressure equalizing connection while breaking the vacuum in the lower chamber thus causing said transfer check valve to close and allowing continued supply of liquid to accumulate in the upper chamber under the vacuum while the first mentioned accumulated liquid drains through a discharge check valve from the lower chamber into the atmosphere until the float control means restore the vacuum to both chambers whereby accumulation of liquid in the lower chamber repeats itself; improved float control means which comprise a float chamber arranged laterally of said lower chamber and communicating with the liquid as well as with the freeboard space in the lower chamber; atmospheric relief valve means mounted in the top end of the float chamber comprising a relief valve member having a valve head and a stem depending therefrom and associated with a downwardly open end portion of said pressure equalizing connection extending through and mounted in said top end of the float chamber adjacent to said relief valve member and terminating in the freeboard space defined by the liquid level in the lower chamber; and a float body loosely guided vertically by said float chamber when rising and falling with the liquid in the lower chamber, and having a top end providing an upward closure face for sealingly engaging the mouth of said downwardly open end portion of the equalizing connection to close the same when the float body rises with said liquid, said top end of the float body also effective to actuate said relief valve member to break the vacuum in said lower chamber in timed relationship to the closing of said mouth, said float chamber having a removable top end plate constituting with said relief valve member and with said downwardly open end portion of said pressure equalizing connection a removable sub-assembly unit, and wherein said valve head has thread connection with said stem whereby the depending length of said stem is adjustable for varying the differential between that length and the length for varying said timed relation between the breaking of the vacuum and the closing of the mouth.

4. In a receiver apparatus operating in repetitive automatic fill and discharge cycles for discharging liquid from a vacuum system wherein liquid supplied under vacuum to an upper storage chamber gravitates through a transfer check valve into a lower storage chamber having pressure equalizing connection with the upper chamber so that the liquid will accumulate in the lower chamber to a point where float control means associated with the lower chamber become effective to interrupt the pressure equalizing connection while breaking the vacuum in the lower chamber thus causing said transfer check valve to close and allowing continued supply of liquid to accumulate in the upper chamber under the vacuum while the first mentioned accumulated liquid drains through a discharge check valve from the lower chamber into the atmosphere until the float control means restore the vacuum to both chambers whereby accumulation of liquid in the lower chamber repeats itself; improved float control means which comprise a float chamber arranged laterally of said lower chamber and communicating with the liquid as well as with the freeboard space in the lower chamber; atmospheric relief valve means mounted in the top end of the float chamber comprising a relief valve member having a valve head and a stem depending therefrom with an upwardly facing valve seat located on the top end of the float chamber cooperating with said valve head; a downwardly open end portion of said pressure equalizing connection extending downwardly from the top end of the float chamber adjacent to said relief valve member and terminating in the freeboard space defined by the liquid level in the lower chamber and providing a downwardly directed open mouth; a float body loosely guided vertically by said float chamber when rising and falling with the liquid in the lower chamber, and having a top end providing an upward closure face for sealingly engaging said downwardly open mouth to close the same when the float body rises with said liquid, said top end of the float body also effective to engage the stem of the relief valve member to actuate the same to break the vacuum in said lower chamber in timed relationship to the closing of said mouth whereby the relief valve member is opened ahead of the closing of said mouth, and adjustment means for varying the differential of length between said valve member and the associated end portion of the equalizing connection for varying said timed relation between the breaking of the vacuum and the closing of said mouth.

5. The arrangement according to claim 4, wherein said float chamber has a removable top end plate constituting with said relief valve member and with said downwardly open end portion of the pressure equalizing connection a removably sub-assembly, and wherein said valve seat for said valve member comprises a tubular neck rising from the top side of said plate.

6. The arrangement according to claim 4, wherein said float body is in the form of a vertical elongate cylinder of substantial length relative to its diameter having closed ends, and the surrounding float chamber is of corresponding tubular shape for loosely guiding said float member and has a lower end portion constituting a pocket extending below the bottom of said lower chamber.

References Cited in the file of this patent

UNITED STATES PATENTS

| | | |
|---|---|---|
| 833,830 | Gamble | Oct. 23, 1906 |
| 1,484,505 | Kiefer | Feb. 19, 1924 |
| 1,651,495 | Watson | Dec. 6, 1927 |
| 2,339,167 | Hughes | Jan. 11, 1944 |
| 2,364,867 | Mills | Dec. 12, 1944 |
| 2,528,642 | Cover | Nov. 7, 1950 |

FOREIGN PATENTS

| | | |
|---|---|---|
| 216,223 | Great Britain | May 26, 1924 |